United States Patent [19]

Altschuler et al.

[11] Patent Number: 4,632,964

[45] Date of Patent: Dec. 30, 1986

[54] FLEXIBLE FINISHES FROM BRANCHED ALIPHATIC POLYESTER URETHANES AND A MELAMINE CROSSLINKER

[75] Inventors: Lili W. Altschuler, Wynnewood, Pa.; John A. Simms, Wilmington, Del.

[73] Assignee: E. I. Du Pont de Nemours and Company, Wilmington, Del.

[21] Appl. No.: 717,160

[22] Filed: Mar. 28, 1985

[51] Int. Cl.$^4$ .................. C08F 283/04; C08F 20/00; C08G 18/38; C08G 18/42

[52] U.S. Cl. ................................. 525/456; 525/440; 528/73

[58] Field of Search ............... 528/73; 525/456, 440

[56] References Cited

U.S. PATENT DOCUMENTS

| | | | |
|---|---|---|---|
| 3,862,261 | 1/1975 | Stoddard | 525/456 |
| 3,954,899 | 5/1976 | Chang et al. | 260/849 |
| 3,959,201 | 5/1976 | Chang | 525/456 |
| 3,962,521 | 6/1976 | Chang et al. | 525/456 |
| 3,962,522 | 6/1976 | Chang et al. | 428/423 |
| 4,017,556 | 4/1977 | Wang | 525/456 |
| 4,125,570 | 11/1978 | Chang et al. | 525/456 |
| 4,298,724 | 11/1981 | Sommerfeld et al. | 528/302 |
| 4,419,407 | 12/1983 | Piccirilli et al. | 428/423.1 |
| 4,423,179 | 12/1983 | Guagliardo | 524/539 |
| 4,442,269 | 4/1984 | Sommerfeld et al. | 525/440 |
| 4,451,622 | 5/1984 | DiDomenico | 525/456 |
| 4,524,192 | 6/1985 | Alexander et al. | 525/440 |
| 4,530,976 | 7/1985 | Kordomenos et al. | 525/440 |
| 4,533,716 | 8/1985 | Okoshi et al. | 528/73 |
| 4,553,703 | 8/1985 | Kordomenos et al. | 525/440 |
| 4,553,704 | 8/1985 | Alexander et al. | 525/440 |

OTHER PUBLICATIONS

"High Solids Amino Crosslinking Agents", published by American Cyanamid Co., (Wayne, N.J.), Jul., 1984, 21 pages.

*Primary Examiner*—Herbert S. Cockeram
*Attorney, Agent, or Firm*—Hilmar L. Fricke

[57] ABSTRACT

A coating composition that forms a flexible finish and is used primarily as a clear finish over a colored or pigmented finish that are applied to flexible substrates of automobile and truck bodies; the composition contains as the film forming binder (1) a branched aliphatic polyester urethane which is the reaction product of a polyisocyanate and a branched aliphatic polyester and (2) preferably a methylated and butylated melamine formaldehyde crosslinking agent.

8 Claims, No Drawings

FLEXIBLE FINISHES FROM BRANCHED ALIPHATIC POLYESTER URETHANES AND A MELAMINE CROSSLINKER

BACKGROUND OF THE INVENTION

This invention is related to a coating composition useful for finishing flexible substrates.

In modern auotmobiles and trucks, flexible plastic or rubber substrates are used, for example, flexible filler panels are located between the bumper and the chassis, flexible materials are used as fender extensions around headlights and tail lights and other flexible exterior trim parts are used. Finishes are applied to these flexible substrates. One particular finish that provides an excellent aesthetic appearance has a colored base coat which contains pigments and a clear topcoat which is unpigmented. This is known as a clear coat/color coat finish. In particular, the cleare topcoat must have excellent durability, flexibility and weatherability. Hick U.S. Pat. No. 3,841,895 issued Oct. 15, 1974 shows a flexible finish for automobiles and trucks. The finish taught by Hick is a pigmented or colored finish that has acceptable qualities. However, there is a need for a clear topcoating composition that has improved durability, adhesion and weatherability.

The composition of this invention forms a high quality clear finish when applied over a colored base coat and is useful for automobiles and trucks.

SUMMARY OF THE INVENTION

A coating composition that forms a flexible finish containing about 20–80% by weight of a film forming binder and about 80–20% by weight; of a liquid carrier; wherein the binder comprises
(1) a branched aliphatic polyester urethane have a hydroxyl number of about 10–200 and a weight average molecular weight of about 6,000–30,000; wherein the polyester urethane is formed by reacting a branched hydroxy polyester with a polyisocyanate wherein the polyester is the esterification product of an aliphatic glycol, a polyhydric alcohol having at least 3 hydroxyl groups and an aliphatic dicarboxylic acid and
(2) a methylated and butylated melamine formaldehyde crosslinking agent having a degree of polymerization of about 1–3.

DETAILED DESCRIPTION OF THE INVENTION

The coating composition has a film forming binder content of about 20–80% by weight and correspondingly liquid carrier of about 20–80% by weight.

The composition forms an excellent clear topcoat for clear coat/color coat finishes that are used over flexible substrates of automobiles and trucks. Flexible substrates are used as filler panels, side panels, fender extensions, moldings and other trim parts. The flexible substrates can be hydrocarbon rubbers such as ethylene/propylene, ethylene/propylene/diene polymers, terpolymer elastomers, polyvinyl chloride, chlorinated rubbers, chloro-sulfonated rubber, acrylonitrile/butadiene/styrene polymers, urethane foamed elastomers, thermoplastic urethanes, crystalline amorphous polyamides, reaction injection molded urethanes and the like.

Preferably, the coating composition is a high solids coating that contains about 50–80% by weight of the binder and 20–50% by weight of organic solvent for the binder. The binder of the composition preferably is a blend of about 50–70% by weight a branched, aliphatic polyester urethane and 30–50% by weight of a methylated and butylated melamine formaldehyde crosslinking agent.

It is important that the aliphatic polyester urethane in the high solids compositions is in an ungelled state to provide an acceptable composition having good application properties. The branched aliphatic polyester urethane is the reaction product of a hydroxyl terminated polyester and a polyisocyanate, preferably, an aliphatic or cycloaliphatic diisocyanate. The urethane has a hydroxyl number of about 10–200 and preferably 40–160 and has a weight average molecular weight of about 6,000–30,000 and preferably 9,000–17,000 and a number average molecular weight of about 2,000–5,000 and preferably 3,000–4,000. Molecular weight is measured using gel permeation chromatography using polymethyl methacrylate as a standard.

Typical polyisocyanates that can be used to form the polyester urethane are as follows: isophorone diisocyanate which is 3-isocyanatemethyl-3,5,5-trimethyl -cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethylene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like, meta-phenylene diisocyanate, para-phenylene diisocyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like: 2,2'biphenylene diisocyanate, 3,3'-biphenylene diisocyanate, 4,4'-biphenylene diisocyanate, 3,3'-demethyl-4,4'biphenylene diisocyanate, and the like; methylene-bis(4-phenyl isocyanate), ethylene-bis(4-phenyl isocyanate), isopropylidene-bis-(4-phenyl isocyanate), butylene-bis(4-phenylisocyanate), and the like; 2,2'-oxydiphenyl diisocyanate, 3,3'-oxydiphenyl diisocyanate, 4,4'oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate, 3,3'-thiodiphenyl diisocyanate, 4,4'-thiodiphenyl diisocyanate, and the like; 2,2'-sulfonediphenyl diisocyanate, 3,3'-sulfonediphenyl diisocyanate, 4,4'-sulfonediphenyl diisocyanate, and the like; 2,2,-methylene-bis-(cyclohexyl isocyanate), 3,3'-methylene-bis-(cyclohexyl isocyanate), 4,4'-methylene-bis-(cyclohexyl isocyanate), 4,4'-ethylene-bis(cyclohexyl isocyanate), 4,4'-propylene-bis-(cyclohexyl isocyanate), bis-(para-isocyano-cyclohexyl)sulfide, bis-(para-isocyano-cyclohexyl)sulfone, bis-(para-isocyano-cyclohexyl)ether, bis-(para-isocyano-cyclohexyl)diethyl silane, bis-(para-isocyano-cyclohexyl)diphenyl silane, bis-(para-isocyano-cyclohexyl)ethyl phosphine oxide, bis-(para-isocyano-cyclohexyl)phenyl phosphine oxide, bis-(para-isocyano-cyclohexyl)N-phenyl amine, bis-(para-isocyano-cyclohexyl)N-methyl amine, bis-(4-isocyano-phenyl)diethyl silane, bis-(4,isocyano-phenyl)diphenyl silane, dichloro-biphenylene diisocyanate, bis-(4-isocyano-phenyl)ethyl phosphine oxide, bis-(4-isocyano-phenyl)phenyl phosphine oxide, bis-(4-isocyano-phenyl)-N-phenyl amine, bis-(4-isocyano-phenyl)-N-methyl amine, 3,3'-dimethyl-4,4'-diisocyano biphenyl, 3,3'-dimethoxy-biphenylene diisocyanate, 2,4- bis-(b-isocyano-t-butyl)toluene, bis-(para-b-isocyano-t-butyl-phenyl)ether, para-bis-(2-methyl-4-isocyanophenyl)benzene, 3,3-diisocyano adamantane, 3,3-diisocyano biadamantane, 3,3-diisocyanoethyl-1-'-biadamantane, 1,2-bis-(3-isocyano-propoxy)ethane, 2,2-dimethyl propylene diisocyanate, 3-methoxy-hexamethylene diisocyanate 2,5-dimethyl heptamethylene diisocyanate, 5-metyl-nonamethylene diisocyanate, 1,4-diisocyano-cyclohexane, 1,2-diisocyano-octadecane, 2,5-diisocyano-1,3,4-oxadiazole, OCN(CH$_2$)$_3$O(CH$_2$-)$_2$O(CH$_2$)$_3$NCO, OCN(CH$_2$)$_3$S(CH$_2$)$_3$NCO and

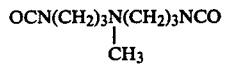

To form urethanes that have excellent weatherability, aliphatic diisocyanates are preferred. One aliphatic diisocyanate that is particularly preferred is a mixture of 2,2,4-trimethyl hexamethylene diisocyanate and 2,4,4-trimethyl hexamethylene diisocyanate. One cycloaliphatic diisocyanate that is particularly preferred is 4,4'-methylene-bis-(cyclohexylisocyanate).

The polyester used to form the polyester urethane is the esterification product of an alkylene glycol, a polyhydric alcohol having at least 3 hydroxy groups, and an aliphatic dicarboxylic acids.

The polyester preferably has a hydroxyl number of 100–300 preferably 110–250 and has an acid number of 2 or less, preferably 1 or less.

Typical alkylene glycols that can be used to form the polyester are as follows: neopentyl glycol, ethylene glycol, propylene glycol, butane diol, pentane diol, 1,6 hexane diol, 2,2-dimethyl-1,3-dioxolane-4-methanol, 4-cyclohexane dimethanol, 2,2-dimethyl 1,3-propanediol, 2,2-bis(hydroxymethyl)propionic acid, and 3-mercapto-1,2-propane diol. Neopentyl glycol is preferred to form a flexible polyurethane that is soluble in conventional solvents.

Polyhydric alcohols having at least three hydroxyl groups introduce branching in the polyester. Typically useful polyhydric alcohols are trimethylol propane, trimethylol ethane, pentaerythritol, glycerin and the like. Trimethylol propane is preferred to form a branched polyester.

Typical aliphatic dicarboxylic acids that can be used to form the polyester are as follows: adipic acid, sebacic acid, succinic acid, azelaic acid, dodecanedioic acid and the like. Preferably two aliphatic dicarboxylic acids are used such as dodecanedioic acid and azelaic acid.

One preferred polyester urethane is the reaction product of trimethyl hexamethylene diisocyanate and a hydroxyl terminated polyester of neopentyl glycol, trimethylol propane, azelaic acid and dodecanedioic acid.

Another preferred polyester urethane is the reaction product of 4,4'-methylene-bis-(cylcohexyl isocyanate) and a hydroxy terminated polyester of 1,6 hexane diol, cyclohexane dimethanol, trimethylol propane and azelaic acid.

The polyester is prepared by conventional techniques in which the alkylene glycol, polyhydric alcohol and aliphatic dicarboxylic acid and solvents are esterified at about 110°–250° C. for about 1–10 hours to form a polyester. The polyisocyanate is then added and reacted at about 100°–200° C. for about 15 minutes–2 hours to form the polyester urethane.

An esterification catalysts can be used to prepare the polyester. Typical catalysts are are benzyl trimethyl ammonium hydroxide, tetramethyl ammonium chloride, organic tin compounds, such as dibutyl tin dilaurate, dibutyl tin oxide stannous octoate and the like, titanium complexes and litharge. About 0.1–4% by weight, based on the total weight of the polyester, of the catalyst is used. The aforementioned catalysts can be used to form the polyester urethane.

Typical solvents and diluents which can be used are, for example, toluene, xylene, butyl acetate, acetone, methylisobutyl ketone, methylethyl ketone, methanol, isopropanol, butanol, hexane, acetone, ethylene glycol monoethyl ether, VM and P naphtha, mineral spirits and other aliphatic, cycloaliphatic, aromatic hydrocarbons, esters, ethers and ketones and the like.

The crosslinking agent used in the composition is a methylated and butylated melamine formaldehyde that has a degree of polymerization of about 1–3. Generally, this melamine formaldehyde contains about 50% butylated groups and 50% methylated groups. Typically these crosslinking agents have a number average molecular weight of about 300–600 and a weight average molecular of about 500–1500.

It is possible to use other alkylated melamine formaldehyde crosslinking agents. Typically, lower alkyl alcohols are used to form these crosslinking agents such as methanol, ethanol, propanol, isopropanol, butanol, isobutanol, hexanol and the like.

Also, urea formaldehyde, benzoquanamine formaldehyde and polyisocyanates may be used as crosslinking agents.

An acid catalyst solution can be added to the composition to increase the rate of crosslinking of the composition on curing. Generally, about 0.1–2% by weight, based on the weight of the composition, of acid catalyst is used. Sulfonic acid or a substituted sulfonic acid can be used such as para-toluene sulfonic acid, dodecylbenzene sulfonic acid or dinonyl naphthalene disulfonic acid and mixtures thereof.

Adducts of the aforementioned acids also can be used as catalysts. For example, epoxy resins or amines reacted with a substituted sulfonic acid may be used. Typical epoxy resins that can be used to form these adducts are "Epon" 828, 1001, 1002, 1003, 1004 which are the condensation products of epichlorohydrin and bisphenol A. Amines that are useful for forming adducts of these acids include primary, secondary and tertiary amines such as n-propyl amine, diisopropanol amine, dimethyl oxazolidine, dimethyl ethanol amine and others. Selection of the amines to be used is dependent upon baking conditions and package stability requirements.

Other catalysts that can be used include phosphoric acid, alkyl acid phosphates such as methyl and butyl acid phosphate and organic acid sulfate esters.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclbenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methyphenyl)benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-tbutyl-4-hydroxyphenylpropionic acid, asymmetrical oxalic acid diarylamides, alkylhydroxyphenylthioalkanoic acid esters, dialkylhydroxyphenylalkanoic acid ester of di- and tri-pentaerythritol, phenyl- and naphthlene- substituted oxalic acid diamides, methyl-β-(3,5-di-t-butyl-4-hydroxyphenyl)propionate, α,α'-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenyl-phosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, α-cyano-β,β-diphenylacrylic acid derivatives, bis(2-benzoxazolyl)alkanes, bis(2-naphthoxazolyl)alkanes. methylene malonitriles containing aryl and heterocyclic substitutes, alkylenebis(dithio)carbamate, 4-benzoyl-3-hydroxyphenoxyethyl acrylate. 4-benzoyl-3-hydroxyphenoxyethyl methacrylate, aryl or alkyl-substituted acrylonitriles, 3-methyl-5-isopropylphenyl-6-hydroxycoumarone, 8-acetyl-3-dodecyl-7,7,9,9-tetramethyl-1,3,8-triazaspiro(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-Phenyl-3-methyl-4-decanoylpyrazolate(5)]-Ni, bis[-phenyldithiocarbamato]-Ni(II), and others listed in the above Patent, column 8, line 44 through line 55.

The following blend of ultraviolet light stabilizers is particularly preferred 2[2'-hydroxy-3',5'-1(1-1-dimethyl-propyl)phenyl]benzo-triazole and bis-[4-(1,2,2,6,6-pentamethylpiperidyl)] 2-butyl-2-[(3,5-t-butyl-4-hydroxyphenyl)methyl] propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3 hydroxy-3,5'-ditert amyl phenyl)-benxotriazole.

Generally, the clear coating composition of this invention is applied by conventional spraying techniques, preferably electrostatic spraying is used, to a color or base coat of an automobile or truck before the color coat is baked. The coatings are baked at about 110° to 230° C. for about 20 to 40 minutes. The resulting clear coat is about 1-5 mils thick preferably 1-2 mils thick and has excellent gloss, good adhesion to the color coat and excellent weatherability.

The following examples illustrate the invention. All parts and percentages are on a weight basis unless otherwise indicated. The weight average molecular weight of polymers was determined by 6PC (gel permeation chromatography) using polyethyl methacrylate as a standard.

EXAMPLE 1

A polyester urethane solution was prepared by charging the following constituents into a reaction vessel equipped with a stirrer, a heating source and a reflux condenser:

|  | Parts by Weight |
|---|---|
| Portion 1 | |
| Water | 212.30 |
| Neopentyl glycol | 1910.60 |
| Portion 2 | |
| Trimethylol propane | 259.53 |
| Azelaic acid | 1454.24 |
| Dodecanedioic acid | 1779.12 |
| Portion 3 | |
| Toluene | 113.60 |
| Portion 4 | |
| Toluene | 190.55 |
| Aromatic hydrocarbon solvent | 886.00 |
| Portion 5 | |
| Neopentyl glycol | 394.03 |
| Stannous octoate | 0.85 |
| Portion 6 | |
| 2,2,4-Trimethyl hexamethylene diisocyanate mixed approximately 1:1 with 2,4,4-Trimethyl hexamethylene diisocyanate | 1069.52 |
| Portion 7 | |
| Aromatic hydrocarbon solvent | 945.70 |
| Total | 9216.04 |

Portion 1 was charged into the reaction vessel, the reaction vessel was purged with nitrogen and the constituents of Portion 1 were heated to about 65°-70° C. The constituents of Portion 2 were charged into the vessel in the order shown while the constituents in the vessel were maintained at the above temperature. The constituents then were heated to 120° C. and the resulting composition was refluxed to remove water as a polyester was formed and the temperature was gradually increased as water was removed until it reached about 240° C. Heating was continued until an acid number of the polyester was about 0-1.5. Portion 3 then was added. Heating was stopped and Portion 4 was added to cool the resulting composition to about 120° C. Portion 5 then was added and moisture content of the composition was determined by a Fisher method. If the moisture content was over 0.1%, the composition would be dried azeotropically for 30 minutes and moisture content again was determined. Portion 6 was added to the composition at a uniform rate over a 30 minute period without external heating. The composition was held at about 120°-145° C. for 30 minutes and a sample removed and tested for unreacted isocyanate by infrared analysis. If there was unreacted isocyanate in the composition, the composition would be held for an additional 30 minutes at the above temperature.

Portion 7 then was added and the resulting composition was allowed to cool to ambient temperatures.

The resulting composition had a polymer weight solids content of about 76%. The polyester urethane contained about 32% neopentyl glycol, 4% trimethylol propane, 22% azelaic acid, 26% dodecanedioic acid and 16% trimethylol hexamethylene diisocyanate and had a Mw (weight average molecular weight) of 15,000 determined by GPC and had a hydroxyl number of 54–68.

A blocked aromatic sulfonic acid solution was prepared as follows:

|  | Parts by Weight |
|---|---|
| Portion 1 | |
| Methanol | 267.26 |
| Aromatic sulfonic acid solution (70% solids of dodecyl benzene sulfonic acid in isopropanol) | 296.99 |
| Methanol | 36.35 |
| Portion 2 | |
| Oxazoline solution (76% 4,4-dimethyl-1-oxa-3-azacyclopentane, 2% 3,4,4-trimethyl-1-oxa-azocyclopentane in 22% water) | 91.05 |
| Portion 3 | |
| Methanol | 36.35 |
| Total | 728.00 |

Portion 1 was charged into a reaction vessel and then portion 2 was added and allowed to react and then portion 3 was added and the solution was cooled to an ambient temperature.

A clear coating composition was prepared by blending together the following constituents:

|  | Parts by Weight |
|---|---|
| Portion 1 | |
| Polyester urethane solution (prepared above) | 383.58 |
| Ultraviolet light screener solution[16% solids in xylene of a 50/50 mixture of 2-(benzo-triazole-2-VL)-4,6-bis(methyl ethyl-1-phenyl ethyl)phenol and 2(3-hydroxy-3,5′-ditert amyl phenyl)benzotriazole] | 63.87 |
| Flow control agent (acrylic terpolymer in aromatic solvent) | 2.03 |
| Light stabilizer solution [30% solids in xylene of a hindered amine light stabilizer of 8-acetyl-3-dodecyl-7,7,9,9-tetramethyl 2,3,8 triazaspiro(4.5) decane-2,4-dione] | 17.05 |
| Methylated/butylated melamine formaldehyde (81% formylated, 65% alkylated; 34% methylated and 31% butylated based on triazine having Mn 540 Mw 1300 and a degree of polymerization of about 2.1) | 207.72 |
| Portion 2 | |
| Ethylene glycol monobutyl ether | 39.34 |
| Methanol | 17.24 |
| Butanol | 63.53 |
| Blocked aromatic sulfonic acid solution (prepared above) | 25.02 |
| Aromatic sulfonic acid solution (51% solids in methanol of dodecylbenzene sulfonic acid) | 2.62 |
| Total | 822.00 |

The constituents of portion 1 were added to a mixing vessel in the order shown and blended for about 1 hour. Portion 2 was added with thorough mixing to form a clear coating composition.

The resulting clear coating composition was sprayed onto primed flexible panels of reaction injection molded urethane that were coated with a pigmented flexible acrylic base coat. The composition was sprayed onto the panels before the base coat was baked. The panels were baked at 120° C. for 30 minutes. The clear coating on each of the panels was about 2 mils thick. The clear coating had a hardness of 1–3 knoops, a gloss measured at 20 degrees of 90, a distinctness of image of about 75 and exhibited no film failures after being subjected to a ¼ inch mandrel bend test at 28° C.

EXAMPLE 2

A polyester urethane solution was prepared by charging the following constituents into a reaction vessel equipped as in Example 1.

|  | Parts By Weight |
|---|---|
| Portion 1 | |
| Cyclohexane dimethanol | 1015.20 |
| Trimethylol propane | 311.85 |
| Azelaic acid | 1163.70 |
| Toluene | 45.60 |
| Portion 2 | |
| Xylene | 403.2 |
| Portion 3 | |
| 1,6-hexane diol | 172.3 |
| Portion 4 | |
| Stannous octoate | 0.3 |
| Portion 5 | |
| 4,4′-Methylene-bis-(cyclohexylioscyanate) | 513.2 |
| Portion 6 | |
| Xylene | 503.2 |
| Total | 4128.55 |

The cyclohexane dimethanol was melted and charged with the other constituents of Portion 1 into the reaction vessel and heated to 120°–240° C. About 222.8 parts of water were removed and the acid no. of the resulting polyester was about 0–2. Portion 2 then was added to the polyester and held at 120° C. Portion 3 was melted and then added to the reaction mixture and Portion 4 was added and the reaction mixture was held at 120° C. Portion 5 was added over a 30 minute period while maintaining the temperature of the reaction mixture at about 120°–140° C. and held at this temperature for an additional 30 minutes. A sample was tested by infrared analysis for isocyanate. In the event isocyanate was present, the reaction would be continued until all isocyante was reacted. Portion 6 then was added.

The resulting polyester urethane solution had a polymer solids content of 71% of a Gardner Holdt viscosity measured at 25° C. of Z5−¼. The polyester urethane had an acid No. of about 1.5, a hydroxyl No. of 143, Mn of 3920 and Mw of 11,800.

A coating composition was prepared as in Example 1 using the same constituents except the above prepared polyester urethane solution was substituted for the polyester urethane solution used in Example 1. The resulting coating composition was sprayed onto primed flexible panels described in Example 1 coated with a pigmented flexible acrylic base coat while the base coat was still wet and the resulting coated panels were baked as in Example 1. The resulting cured coating had about the same gloss, hardness, distinctness of image and flexibility as the coating of Example 1.

EXAMPLE 3

A polyester urethane solution was prepared by charging the following constituents into a reaction vessel equipped as in Example 1:

|  | Parts By Weight |
|---|---|
| Portion 1 | |
| 1,6 Hexane diol | 831.90 |
| Trimethylol propane | 311.85 |
| Azelaic Acid | 1163.70 |
| Toluene | 46.00 |
| Portion 2 | |
| Xylene | 383.80 |
| Portion 3 | |
| Cyclohexane dimethanol | 210.00 |
| Stannous octoate | 0.30 |
| Portion 4 | |
| 4,4'-Methylene-bis-(cyclohexylisocyanate) | 512.90 |
| Portion 5 | |
| Xylene | 480.00 |
| Total | 3940.45 |

The 1,6 hexane diol was melted and charged with other constituents of Portion 1 into the reaction vessel and heated to 120°-240° C. About 222.8 parts of water were removed and the acid no. of the polyester was about 0-2. Portions 2 was added. The cyclohexane dimethanol of Portion 3 was melted and then added and then the stannous octoate was added and the mixture heated to 120° C. Portion 4 was added over a 30 minute period and the reaction mixture was held at 120°-140° C. and then held at this temperature for an additional 30 minutes. A sample was tested by infrared analysis for isocyanate. If isocyanate was present, the reaction would be continued until all isocyanate was reacted. Portion 5 then was added.

The resulting polyester urethane solution had a polymer solids content of about 72%, a Gardner Holdt viscosity measured at 25° C. of Z1+⅓. The polyester urethane had an acid No. of 1.59, a hydroxyl No. of 155.5, Mn of 1,400 and Mw of 10,000.

A coating composition was prepared using the same constituents as in Example 1 except the above polyester urethane solution was substituted for the polyester urethane solution of Example 1. The resulting coating composition was sprayed onto primed flexible panels described in Example 1 coated with a pigmented flexible acrylic base coat while the base coat was still wet and the resulting coated panels were baked as in Example 1. The resulting cured coating had about the same gloss, hardness, distinctness of image and flexibility as the coating of Example 1.

We claim:
1. A coating composition that forms a clear flexible finish comprising about 50-80% by weight of film forming binder and about 20-50% by weight of an organic solvent for the binder; wherein the binder consists essentially of about
   (1) 50-70% by weight, based on the weight of the binder, of an ungelled branched polyester urethane having a hydroxyl number of about 10-200 and a weight average molecular weight of about 6,000-30,000; wherein the polyester urethane is the reaction product of a hydroxyl terminated branched polyester and a polyisocyanate; wherein the polyester is the esterification product of an aliphatic glycol, a polyhydric alcohol having at least three hydroxyl groups, and aliphatic dicarboxylic acid and
   (2) 30-50% by weight, based on the weight of the binder, of a fully methylated and butylated melamine formaldehyde crosslinking agent containing about 50% methylated groups and about 50% butylated groups and having a degree of polymerization of about 1-3.
2. The coating composition of claim 1 in which the polyester urethane has a hydroxyl number of about 40-160 and is the reaction product of an aliphatic diisocyanate and a hydroxyl terminated branched polyester which is the esterification product of neopentyl glycol, trimethylol propane, azelaic acid and dodecanedioic acid.
3. The coating composition of claim 1 in which the polyester urethane has a hydroxyl number of about 40-160 and is the reaction product of a cycloaliphatic diisocyanate and a hydroxyl terminated branched polyester which is the esterification product of hexane diol, cyclohexane dimethanol, trimethylol propane and azelaic acid.
4. The coating composition of claim 2 in which the melamine formaldehyde is about 50% methylated and 50% butylated.
5. The coating composition of claim 1 containing in addition about 0.1-5% by weight, based on the weight of the binder of an ultraviolet light stabilizer.
6. The coating composition of claim 1 which comprises 50-80% by weight of film forming binder and 20-50% by weight of an organic solvent for the binder; wherein the binder consists essentially of about
   (1) an ungelled polyester urethane that has a hydroxyl number of about 40-160 which is the reaction product of trimethyl hexamethyl diisocyanate and a hydroxy terminated branched polyester consisting essentially of the esterification product of neopentyl glycol, trimethylol propane, azelaic acid and dodecanedioc acid and
   (2) a methylated and butylated melamine formaldehyde being about 50% methylated melamine and 50% butylated and having a degree of polymerization of about 2; and
   the coating composition contains in addition about 0.1-5% by weight of ultraviolet light stabilizer.
7. A substrate coated with a cured layer of the composition of claim 1.
8. A substrate coated with a layer of a pigmented paint composition and having in adherence thereto a layer of the composition of claim 1.

* * * * *